United States Patent [19]
Ohsawa

[11] Patent Number: 5,825,934
[45] Date of Patent: Oct. 20, 1998

[54] ADAPTIVE IMAGE CODING METHOD AND APPARATUS

[75] Inventor: Hidefumi Ohsawa, Kawaguchi, Japan

[73] Assignee: Canon Kabushiki Kaisha, Tokyo, Japan

[21] Appl. No.: 324,458

[22] Filed: Oct. 17, 1994

Related U.S. Application Data

[63] Continuation of Ser. No. 872,142, Apr. 22, 1992, abandoned.

[30] Foreign Application Priority Data

Apr. 23, 1991 [JP] Japan .................................. 3-092291

[51] Int. Cl.$^6$ ........................................... G06R 9/36
[52] U.S. Cl. ........................ 382/246; 349/404; 349/420; 358/433; 382/250
[58] Field of Search ........................... 348/413, 414, 348/415, 416, 417, 418, 419, 420, 404; 382/56, 235, 232, 244, 246, 248, 250, 166; 358/432, 433

[56] References Cited

U.S. PATENT DOCUMENTS

| | | | |
|---|---|---|---|
| 4,797,945 | 1/1989 | Suzuki et al. | 382/488 |
| 4,805,030 | 2/1989 | Tanaka | 358/133 |
| 4,887,151 | 12/1989 | Wataya | 358/80 |
| 4,920,426 | 4/1990 | Hatori et al. | 358/433 |
| 4,922,273 | 5/1990 | Yonekawa et al. | 382/56 |
| 4,974,071 | 11/1990 | Maeda | 358/80 |
| 4,974,078 | 11/1990 | Tsai | 358/133 |
| 5,023,919 | 6/1991 | Wataya | 382/54 |
| 5,051,840 | 9/1991 | Watanabe et al. | 358/432 |
| 5,073,820 | 12/1991 | Nakagawa et al. | 358/133 |
| 5,121,205 | 6/1992 | Ng et al. | 358/133 |
| 5,126,842 | 6/1992 | Andrews et al. | 358/133 |
| 5,146,324 | 9/1992 | Miller et al. | 358/133 |

*Primary Examiner*—Joseph Mancuso
*Attorney, Agent, or Firm*—Fitzpatrick, Cella, Harper & Scinto

[57] ABSTRACT

An ADCT mode or a standard mode of still image encoding is employed to perform fixed length encoding.

According to the present invention, an image processing apparatus includes a circuit for counting code lengths, a circuit for cutting off encoding of a block (appending an end of block (EOB) code at an earlier step). Therefore, when an average code length is longer than a predetermined value, EOB is allocated in the middle of encoding of a block. Thus, code lengths are controlled.

9 Claims, 9 Drawing Sheets

ADAPTIVE IMAGE CODING METHOD AND APPARATUS

This application is a continuation of application Ser. No. 07/872,142 filed Apr. 22, 1992, now abandoned.

BACKGROUND OF THE INVENTION

1. Field of the Invention

The present invention relates to an image encoding mode for, for example, an image recording or image communication apparatus.

2. Related Background Art

In a conventional image encoding mode, pixels are divided in M-by-N (where, M and N are integers) blocks, then a code is assigned to each block. This block encoding is well-known, which is classified into the following two modes:

(1) Variable length encoding mode: a code length is variable for each block, attaining a high compression rate. This mode is suitable for still image communication.

(2) Fixed length encoding mode: a code length is fixed for each block, attaining a constant compression rate. This mode is suitable for image storage in memory having a limited capacity.

Generally, there is no interchangeability between data encoded in variable length and fixed length modes. Therefore, an apparatus designed for image communication or storage must have variable-length and fixed-length encoders to ensure interchangeability between variable and fixed length data. Moreover, handing encoded data becomes very complex and an apparatus becomes physically very big.

In the past, pre-scanning has been repeated to calculate a code length and determine a quantization parameter so that variable length encoding will provide an indented number of codes for a single screen. However, pre-scanning is time-consuming and results in a complex circuit configuration.

On the other hand, a fixed code length per block promises more efficient trimming, masking, or other image editing.

SUMMARY OF THE INVENTION

The object of the present invention is to solve the aforesaid problems, or more particularly, to provide an image processing apparatus having a simple configuration and permitting code length control.

To attain this object, the present invention provides an image processing apparatus comprising an input means for inputting image data, a dividing means for dividing the image data into a plurality of blocks each having a predetermined size, an encoding means for encoding the image data in each block using a fixed parameter and for generating encoded image data, and a control means for cutting off the encoded image data in the block and thus controlling the amount of the encoded image data in the block so that the amount will be within a predetermined value.

Other object of the present invention is to provide an image encoding mode suitable for image editing.

Other object of the present invention is to provide an image encoding mode for simplifying error detection.

To attain these objects, the present invention provides an image processing apparatus comprising an input means for inputting image data, a dividing means for dividing the image data into a plurality of blocks each having a predetermined size, an encoding means for encoding the image data in each block and generating encoded image data, a counting means for counting the amount of the encoded image data in the blocks, a comparing means for comparing the amount with a predetermined value, a control means for controlling the encoding means in accordance with the comparison result of the comparing means so that the amount of the encoded data will be within the predetermined value, and adding data representing the end of the block to the end of the encoded image data.

Other object of the present invention is to use a memory efficiently.

Other object of the present invention is to provide an image processing apparatus capable of cutting out and reproducing part of a compressed image.

Other objects and modes of operation of the present invention will be apparent in conjunction with the drawings and appended claims.

DESCRIPTION OF THE PREFERRED EMBODIMENTS (First embodiment)

Figure 1:
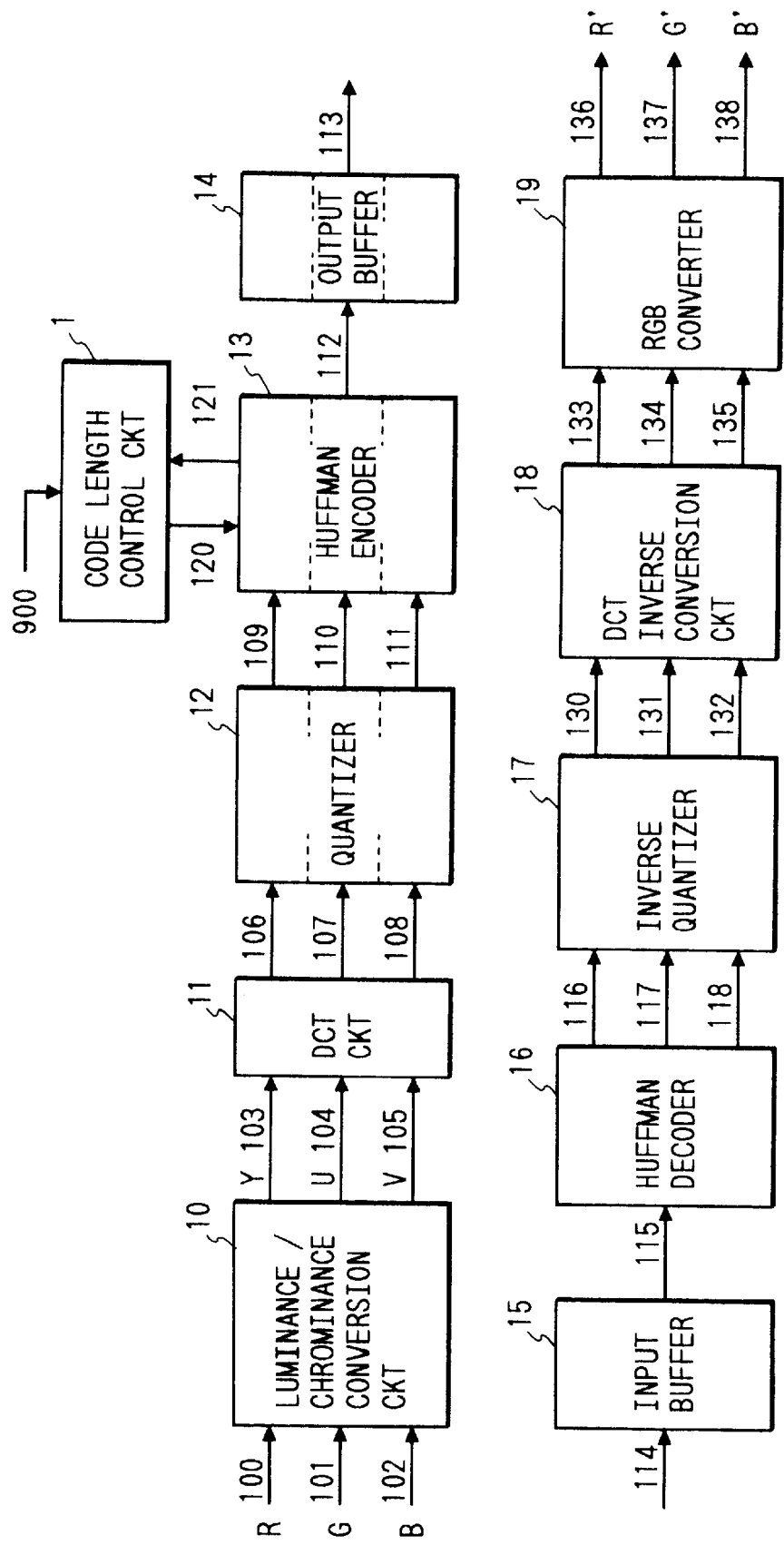
FIG. 1 is a block diagram of an embodiment.

FIG. 1 is a block diagram showing an embodiment of the present invention. Color-phase data consisting of R, G, and B color data each having eight bits is supplied from an image input means which is not shown (an image reader or a host computer having a CD sensor), then converted into Y, U, and V signals by a luminance/chrominance conversion circuit 10. The conversion expression employed is as follows:

$$EY = 0.299 \times (R/255) + 0.587 \times (G/255) + 0.114 \times (B/255)$$

$$EU = 0.713 \times (R/255 - EY)$$

$$EV = 0.564 \times (B/255 - EY)$$

$$Y = 219 \times EY + 16$$

$$U = 224 \times U + 128$$

$$V = 224 \times V + 128$$

where, R, G, or B is an integer ranging from 0 to 255, and EY, EU, or EV is a specified real number.

Next, the Y, U, and V signals are converted according to a two-dimensional discrete cosign by a DCT circuit 11. Specifically, each of the Y, U, and V signals is divided in spatial frequency components. The component is referred to as a DCT conversion factor. The conversion formula for discrete cosine conversion is shown below.

$$F(u, v) = (1/4)C(u)C(v) \sum_{i=0}^{7} \sum_{j=0}^{7} f(i, j) \times \cos(2i + 1) u\pi/16 \times \cos(2j + 1) v\pi/16$$

Next, each of the Y, U, and V signal is linearly quantized in factors by a quantizer 12. Quantization is executed for each factor in steps of different intervals. This provides such a quantization characteristic that lower-frequency components will be divided more finely while high-frequency components will be divided more coarsely.

Next, a Huffman encoder 13 divides each of the Y, U, and V signals into a DC component and an AC component, and assigns Huffman codes to the components. The DC component is subtracted from the DC component in a preceding block. The difference is assigned a Huffman code. As for the zigzag-scanned AC component, both the factors padded with zeros (zero run) and non-zero factor values are assigned Huffman codes. When the values of all factors in a block have been transmitted, end-of-block (hereafter, EOB) data is appended to the end of the block data.

This encoded data is stored in an output buffer 14, then placed on a transmission line.

A decoder fetches an incoming coded word 114 into an input buffer 15, then puts the coded word 114 in a Huffman decoder 16 for decoding. Thus, the coded word 114 is reconverted into DC and AC factors in blocks.

Next, an inverse quantizer 17 applies quantization steps in the same way as the quantizer 12. This provides eight-bit data of each of DC and AC factors for each the Y, U, and V signals. Then, a DCT inverse conversion circuit 18 converts the eight-bit data of each of the Y, U, and V signal into decoded image data of each of Y', U', and V' signals.

Next, an RGB converter 19 converts the Y', U', and V' signals into R', G', and B' signals according to a conversion formula. Then, the R', G', and B' signals are displayed on a display which is not shown.

A code length control 1 receives data 121 specifying a number of generated codes from a Huffman encoder, then provides the Huffman encoder with a signal 120 for controlling the number of codes so that an average code length per block will be within a predetermined value.

Figure 2:
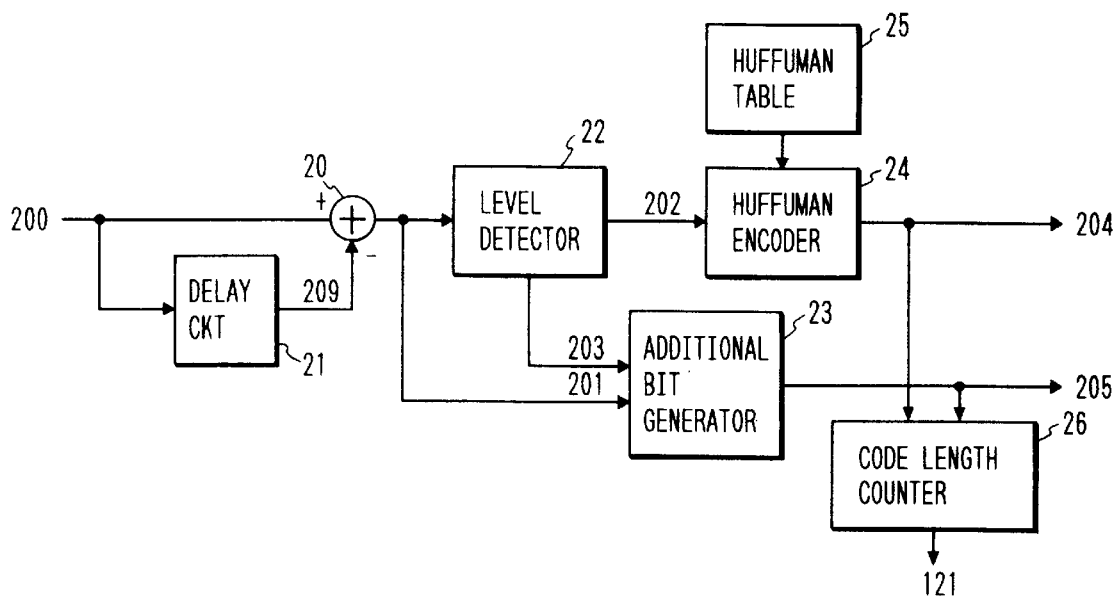
FIG. 2 is a block diagram of a DC-factor Huffman encoder.

FIG. 2 is a block diagram of a Huffman encoder for DC components. Quantized DC factor data 200 is subtracted from an output 209 of a delay circuit 21 or data of an immediately preceding block to be sent to a subtracter 20. As a result, difference data 201 is provided. Next, a level detector 22 detects the level of the difference data and assigns a group number according to the level. Then, a Huffman encoder 24 references a Huffman table 25 to determine a coded word 204 for a group number 202.

An additional bit generator 23 assesses a group number and difference data to generate an identification signal indicating a specific level within the group, then outputs the signal as an additional bit 205. The code lengths of the coded word 204 and additional bit 205 are counted by a code length counter 26.

Figure 4:
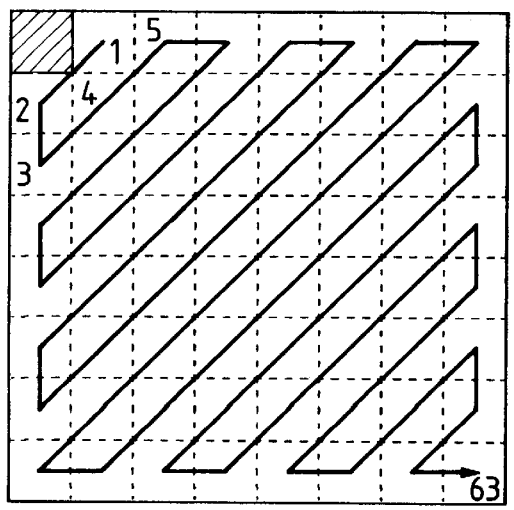
FIG. 4 is an explanatory diagram of zigzag scanning.
Figure 3:
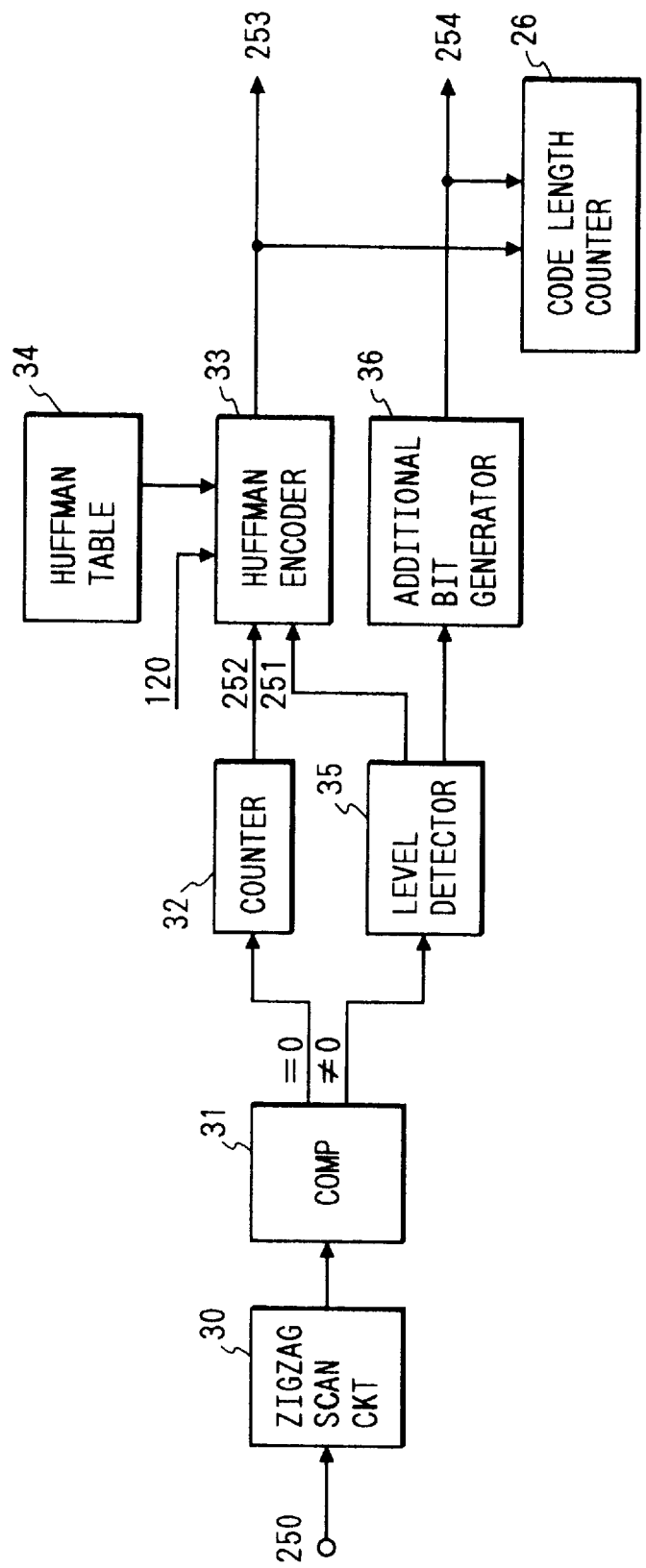
FIG. 3 is a block diagram of an AC-factor Huffman encoder.

FIG. 3 is a block diagram of a Huffman encoder for AC components. Quantized AC factor data 300 is transmitted in an order of FIG. 4 in which AC factors are zigzag-scanned by a zigzag scan circuit 30. Next, a comparator 31 determines whether a factor value is zero. If the factor value is zero, a counter 32 is incremented. If the factor value is not zero, a level detector 35 classifies the level of the factor into a group. Then, a Huffman encoder 33 references a Huffman code table for a group number 251 and a zero count (zero run), then determines a coded word 253.

An additional bit generator 36 generates an identification signal indicating a specific level within a group, then outputs the signal as an additional bit 254. The code lengths of the code 253 and additional bit 254 are counted by a code length counter 37.

Figure 5:
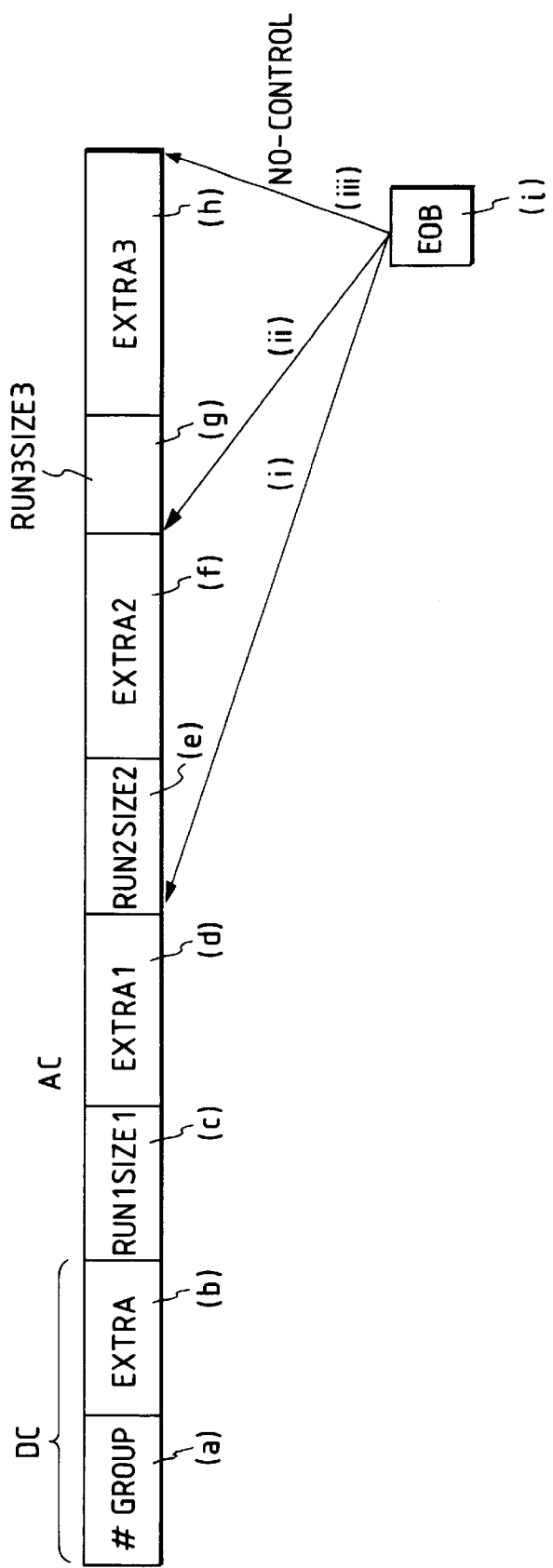
FIG. 5 is an explanatory diagram for explaining an example of codes in a single block and cutting off encoding.

FIG. 5 shows the data structure of encoded data in a single block. In these blocks:

(a) is a group number of a DC factor;
(b) is an additional bit of a DC factor;
(c) is a group number of the first AC factor;
(d) is an additional bit of the first AC factor;
(e) is a group number of the second AC factor; and
(f) is an additional bit of the second AC factor.

After (f), a group number (g) and an additional bit (h) of an AC factor come alternately. Then, an EOB code (i) comes at last.

Code length control assesses an output 121 of a code length control 1 to control a position of appending EOB.

For example, if a previous average code length is larger than a predetermined value, EOB is appended at an earlier step (for example, to a position of (i)). On the contrary, if the previous average code length is smaller, all AC factors are transmitted to the end (EOB is appended to a position of (iii)). This controls the number of occurring codes.

A code length control 1 is provided with code lengths a code length counter counts, then calculates an average code length of multiple blocks.

Then, the average code length is compared with a predetermined target number of codes. If the average code length is larger than the target value, EOB appending is controlled to suppress generation of more codes. Specifically, EOB is appended to the middle of block data. The subsequent codes are cut off. On the contrary, if the average code length is smaller, all block data is transmitted. A control signal 120 used to control EOB appending is supplied to a Huffman encoder.

When an average code length is calculated, codes generated so far may be accumulated and the accumulated number of codes may be averaged, or numbers of codes in one or more blocks may be averaged. However, the present invention is not restricted to either of these methods.

(Second embodiment)

Figure 6:
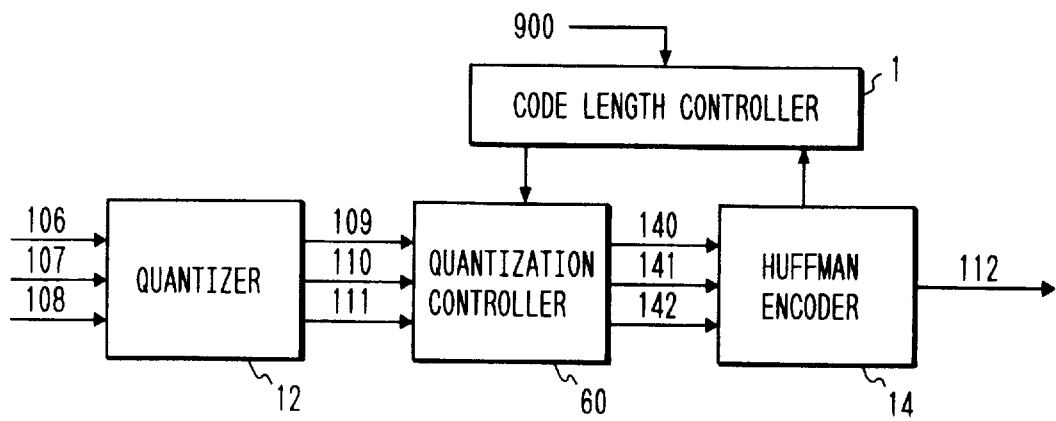
FIG. 6 is an explanatory diagram of the second embodiment.

In other effective method, quantized factor values are further quantized to reduce the amplitudes of the factor values. FIG. 6 shows an embodiment in which a quantization controller 60 is interposed between a quantizer 12 and a Huffman encoder 14. Using code length data sent from the Huffman encoder, a code length control calculates an average code length. A difference from a target code length is assessed to control the quantization controller 60.

Figure 7:
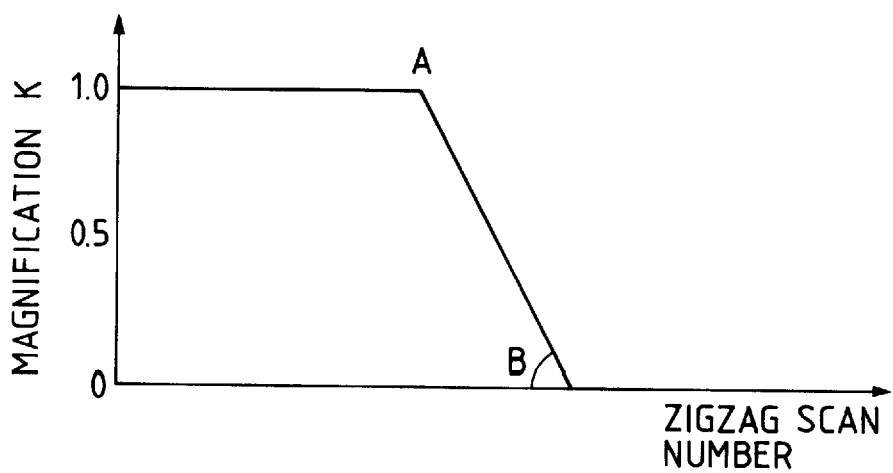
FIG. 7 is an explanatory diagram of magnifications for use in a quantization control.

A quantization controller multiplies quantization values 109, 110, and 111 by a magnification K ($0 \leq K \leq 1$). Herein, the quantization values are sent in an order in which they are zigzag-scanned. FIG. 7 shows an example of K values.

The X axis represents zigzag scan numbers. A larger scan number indicates a higher-frequency DCT factor component. As shown in FIG. 7, the magnification K starts diminishing at a point A linearly along a slope B. The K is used as a multiplier to control the size of an amplitude value.

When the average code length is smaller than a target value, the point A is shifted to the right or the slope is made gentle. Thus, a specific amplitude value is attained. However, when the average code length is larger than a target value, the point A is shifted to the left or the slope is made steep. Thus, the amplitude value is reduced.

Actual control values are determined experimentally.

As described above, a means for monitoring the number of generated codes all the time and a means for controlling generated codes in a block are installed, a variable length encoding mode is used to attain a high compression rate, and encoding is controlled so that code lengths will be within a predetermined value. Thereby, the present invention can apply to image storage.

(Third embodiment)

Figure 8:
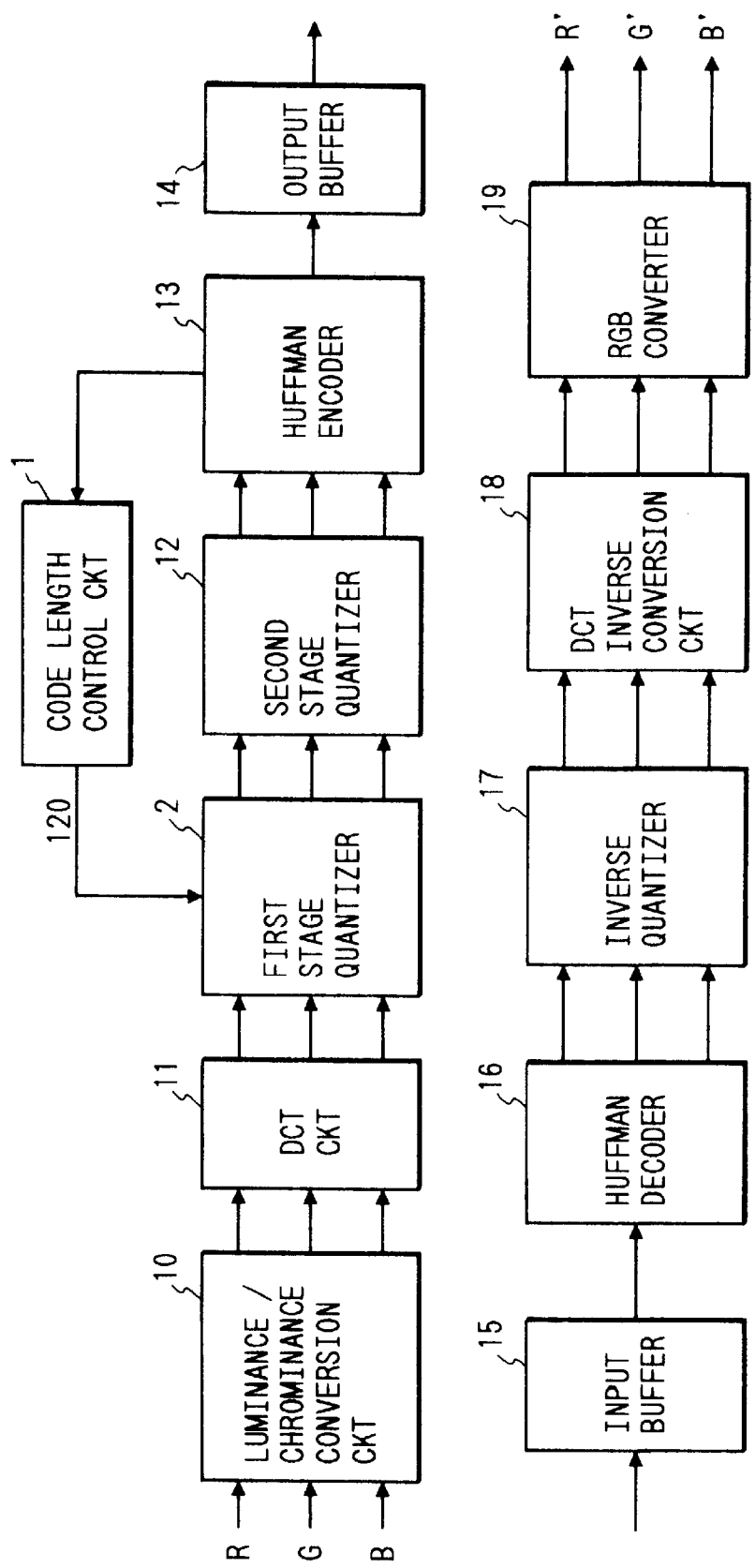
FIG. 8 is a block diagram of other embodiment of the present invention.

FIG. 8 shows the third embodiment of the present invention. Color-phase data made up of R, G, and B color data each having eight bits is sent from an image input means which is not shown, then converted into Y, U, and V signals by a luminance/chrominance conversion circuit 10. The conversion formula employed is as follows:

$$EY = 0.299 \times (R/255) + 0.587 \times (G/255) + 0.114 \times (B/255)$$

$$EU = 0.713 \times (R/255 - EY)$$

$$EV = 0.564 \times (B/255 - EY)$$

$$Y = 219 \times EY + 16$$

$$U = 224 \times U + 128$$

$$V = 224 \times V + 128$$

where, R, G, or B is an integer ranging from 0 to 255, and EY, EU, or EV is a specified real number ranging from 0 to 1.

Next, a DCT circuit 11 converts each of the Y, U, and V signals according to a discrete cosign or divides each of the Y, U, and V signals in spatial frequency components. The component is referred to as a DCT conversion factor. The discrete cosign conversion formula employed is shown below.

$$F(u, v) = (1/4)C(u)C(v) \sum_{i=0}^{7} \sum_{j=0}^{7} f(i, j) \times$$

$$\cos(2i + 1) u\pi/16 \times \cos(2j + 1) v\pi/16$$

Next, a first-stage quantizer 2 executes thresholding to assign zeros to small factor values. The threshold is given by a code length control. When zeros are assigned to the factor values, Huffman codes to be assigned to an AC component, which will be described later, can be shortened.

Then, a second-stage quantizer 12 quantizes factors linearly. Quantization is performed on each factor in steps of different intervals. This provides such a quantization characteristic that lower-frequency components will be divided more finely while higher-frequency components will be divided more coarsely.

Next, a Huffman encoder divides each quantized signal into a DC component and an AC component, then assigns Huffman codes to the components. The DC component is subtracted from a DC component of an immediately preceding block. A Huffman code is assigned to the difference. As for the zigzag-scanned AC component, both the factors padded with zeros (zero run) and non-zero factor values are assigned Huffman codes. When the values of all factors in a block have been transmitted, EOB is appended to the end of the block data.

The code data is stored in an output buffer 14, then placed on a transmission line.

A decoder fetches an incoming coded word into an input buffer 15, then uses a Huffman decoder 16 for decoding. Thus, the coded word is reconverted to DC and AC factors.

Next, an inverse quantizer 17 applies quantization steps to reconvert the DC and AC factors. This provides eight-bit data of each of the DC and AC factors for each of the Y, U, and V signals. Then, a DCT inverse conversion circuit 18 converts the eight-bit data of each of the Y, U, and V data into decoded image data of each of Y', U', and V' signals.

Next, an RGB converter 19 converts the Y', U', and V' signals into R', G', and B' signals according to a conversion formula. Finally, the R', G', and B' signals are displayed on a display which is not shown.

A code length control 1 receives data 121 specifying the number of generated codes from a Huffman encoder, then provides a first-stage quantizer 2 with a signal 120 for controlling the threshold of the first-stage quantizer so that an average code length of blocks will be within a predetermined value.

Figure 9:
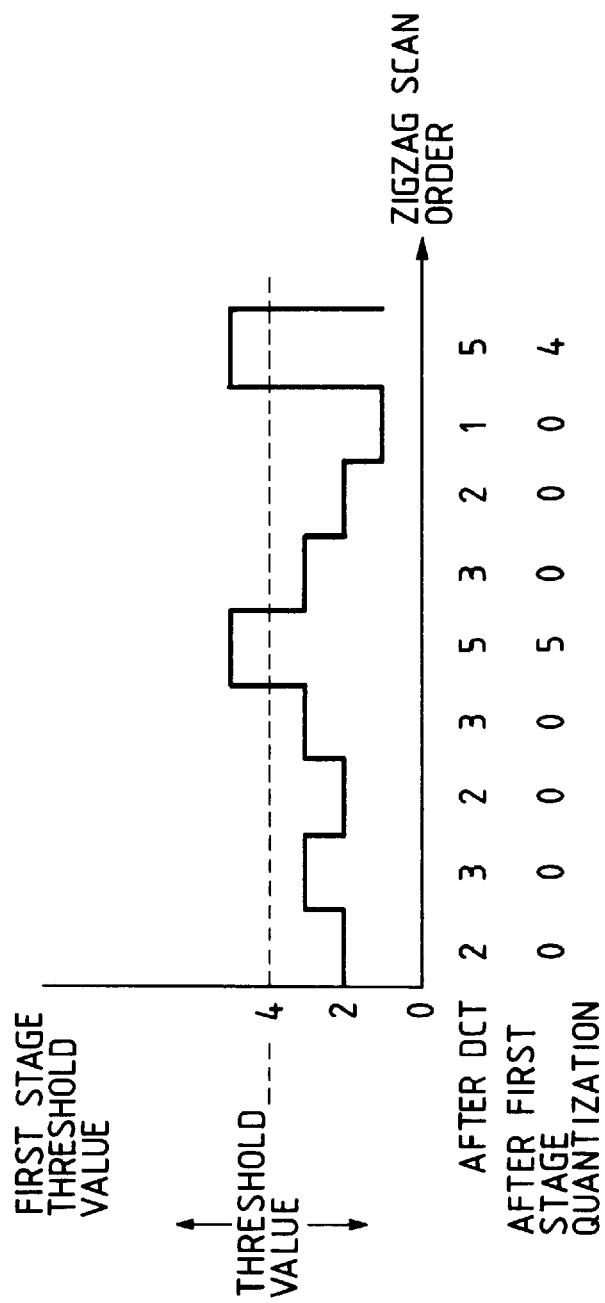
FIG. 9 is an explanatory diagram of thresholding.

FIG. 9 is an explanatory diagram of thresholding. AC factors, which are zigzag-scanned and lined one-dimensionally, undergo thresholding with respect to a threshold (4). When an input array (2, 3, 2, 3, 5, 3, 2, 1, 5) is subjected to thresholding, it is converted into (0, 0, 0, 0, 5, 0, 0, 0, 4). Many AC factors are sent with zeros padded (zero run). As a result, more shorter Huffman codes are assigned.

A control signal 120 for increasing or decreasing a threshold is supplied to a first-stage quantizer.

To calculate an average code length, code lengths of codes generated so far may be accumulated and averaged, or numbers of codes in one or more blocks may be averaged. The present invention is not restricted to either of these methods.

(Fourth embodiment)

If a quantization means in the preceding stage can not only control a threshold but also multiply factor components by a magnification K ($0 \leq K \leq 1$), the quantization means will efficiently control amplitudes of high-frequency factor values.

Figure 10:
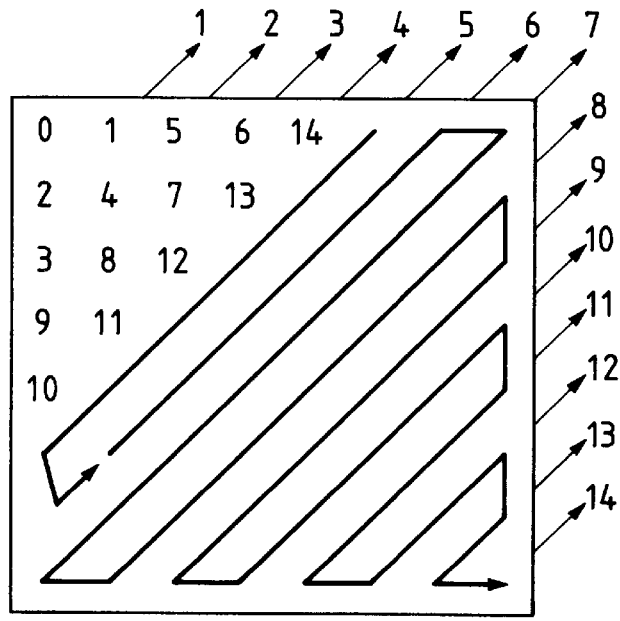
FIG. 10 is an explanatory diagram of group numbers in frequencies.

Factor values handled by a DCT inverse conversion circuit are divided into fourteen groups in frequencies in ascending order of frequencies as shown in FIG. 10. The same value K is used as a multiplier for each group. The K value is determined with a graph of group numbers vs, magnifications shown in FIG. 11.

Figure 11:
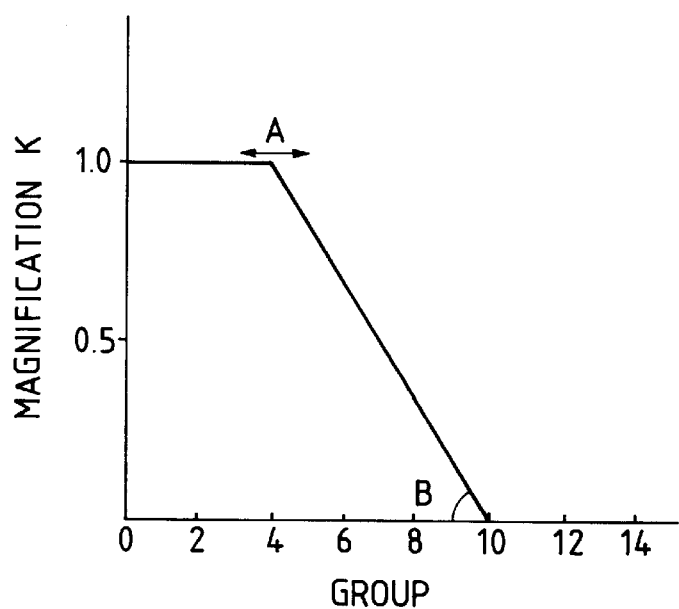
FIG. 11 is a graph for explaining magnifications in groups.

A parallel shift A and a slope B in the curve of FIG. 11 are controlled in association with the relationship between the aforesaid average number of codes and target value.

For example, when an average code size is larger than a target value, A is shifted to the left or the slope is made steeper. On the contrary, when an average code size is smaller than a target value, A is shifted to the right or the slope is made gentler. Actual control values for the A and B are determined experimentally.

As described previously, a means for monitoring the number of generated codes all the time and a means for cutting off generated codes in a block are installed, a variable length encoding mode is employed to attain a high compression rate, and encoding is controlled so that code lengths will be within a predetermined value. Thereby, the present invention can apply to image storage.

According to the present invention, the number of codes can be controlled properly.

(Fifth embodiment)

Figure 12:
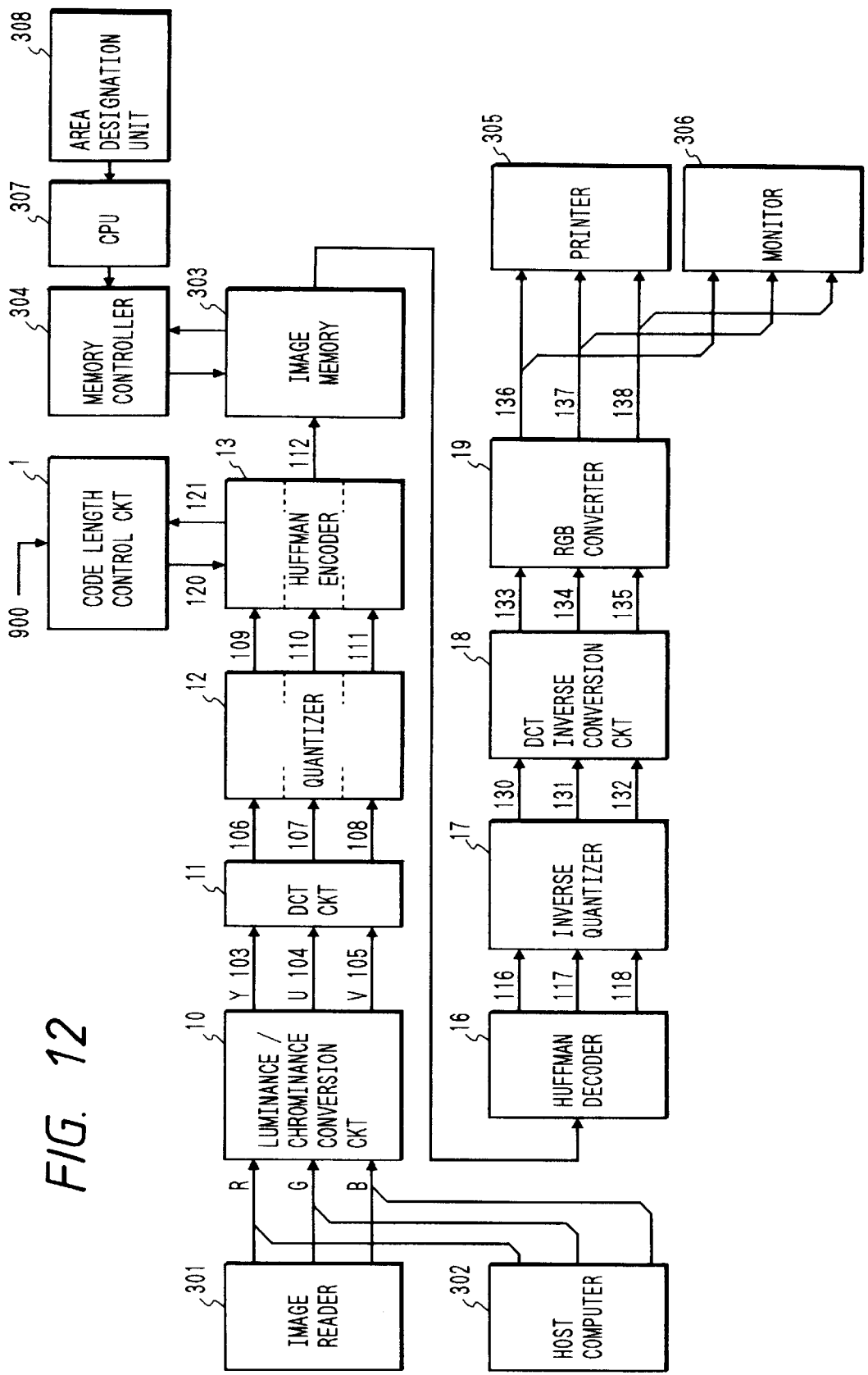
FIG. 12 is a block diagram showing the configuration of the fifth embodiment of the present invention.

FIG. 12 is a block diagram showing the configuration of the fifth embodiment of the present invention.

In a system of this embodiment, image data consisting of R, G, and B color signals is supplied from an image reader 301 formed with a CCD line sensor or a host computer 302.

The encoding procedure is identical to that of the first embodiment. The description will, therefore, be omitted.

Huffman-encoded encoded data 112 is stored in an image memory 303. The image memory 303 is a semiconducting memory capable of containing encoded data for a single screen of A3 size.

Data writing or reading in or from the image memory 303 is controlled by a memory controller 304.

The decoding procedure for decoding encoded data read from the image memory 303 is identical to that of the first embodiment.

R, G, and B data or outputs of an RGB converter 19 are produced as hard copies by a printer 305 or soft copies by a monitor 306.

The printer 305 is, for example, a so-called bubble-jet printer having a print head for discharging droplets of ink electrophotographically or by performing film boiling with thermal energy. The printer includes converters for converting R, G, and B data into Y, M, C, and K printing data.

When encoded data 112 is written, the foregoing memory controller 304 controls addressing as described below.

Assuming that an input is eight-bit data of each of R, G, and B colors, when the input is blocked in 8-by-8 pixels, it is represented as data consisting of 1536 bits (8×3×8×8). The data is compressed to an about one-tenth data size of 128 bits. The memory controller 304 controls addressing in units of 128 bits when encoded data is written in an image memory 303. At that time, when encoded data consists of 128 bits or less, the remaining area is left blank. EOB data is not written in the image memory 303. Thus, since EOB data need not be written in memory, the memory can be used efficiently.

Moreover, only an area a digitizer or other area designation unit 308 designates can be read out.

The area data the area designation unit 308 designates is sent to the memory control 304 by a CPU 307. Then, addressing is controlled so that only encoded data existent in the area pointed to by the area data can be read out successfully.

Since read-out addresses are preliminarily stored in blocks when encoded data is written, addressing can be controlled easily.

The aforesaid configuration simplifies image editing; such as, trimming or masking.

Unlike the foregoing embodiment, writing in memory may not be controlled but encoded data 112 may be stored in an image memory 303. When a designated area is read out, a memory controller 304 may count EOBs, calculate an address of the area to be read, then decode the encoded data at the address.

Input data is not limited to R, G, and B data but may be Y, M, and C data.

Data to be encoded is not restricted to L, U, and V data but may be L*, a*, and b* or Y, Cr, and Cb data.

An encoding mode is not confined to a Huffman encoding mode but may be an entropy encoding mode.

The present invention is not restricted to the aforesaid embodiments but various variants and applications may made within the scope of appended claims.

What is claimed is:

1. An image processing apparatus comprising:
   inputting means for inputting image data representing an input image;
   dividing means for dividing the image data into plural blocks of data and outputting the divided blocks, each block representing a block image of predetermined size, and the input image consisting of the block images in combination;
   converting means for converting target block data included in the plural blocks of data into plural frequency component data;
   block encoding means for separating the plural frequency component data, using a separating method, into first frequency component data used for encoding and second frequency component data not used for encoding, for generating encoded data by using the first frequency component data and an end-of-block code without the second frequency component data, and for outputting the encoded data; and
   holding means for holding information representing a first data amount corresponding to a total amount of encoded data previously produced by said block encoding means,
   wherein the separating method uses a predetermined target amount and the information held by said holding means independently of a total amount of the target block data included in each of the plural blocks of data.

2. An apparatus according to claim 1, wherein said block encoding means encodes each of the blocks of data only once.

3. An apparatus according to claim 1, wherein frequency component data representing a significant coefficient is included in both the first frequency component data and the second frequency component data.

4. An apparatus according to claim 1, wherein said block encoding means encodes such that an amount of the second frequency component data tends to zero, according the predetermined target amount and the information held by said holding means.

5. An apparatus according to claim 1, wherein said converting means converts the blocks of data into the first and second frequency component data by using a DCT (discrete cosine transform).

6. An apparatus according to claim 1, wherein the first frequency component data is data representing frequency components lower than those represented by the second frequency component data.

7. An apparatus according to claim 1, wherein said block encoding means generates the encoded data corresponding to a block by Huffman encoding the first frequency component data and appending thereto the end-of-block code.

8. An apparatus according to claim 1, wherein the information represents an average of the amounts of encoded data corresponding to respective blocks of data.

9. An image processing method comprising the steps of:
   inputting image data representing an input image;
   dividing the image data into plural blocks of data and outputting the divided blocks, each block representing a block image of predetermined size, and the input image consisting of the block images in combination;
   converting target block data included in the plural blocks of data into plural frequency component data;
   separating the plural frequency component data, using a separating method, into first frequency component data used for encoding and second frequency component data not used for encoding;
   generating encoded data by using the first frequency component data and an end-of-block code without the second frequency component data;
   outputting the encoded data; and
   holding information representing a first data amount corresponding to a total amount of encoded data previously produced by said block encoding means,
   wherein the separating method uses a predetermined target amount and the held information independently of a total amount of the target block data included in each of the plural blocks of data.

* * * * *

UNITED STATES PATENT AND TRADEMARK OFFICE
CERTIFICATE OF CORRECTION

PATENT NO. : 5,825,934
DATED      : October 20, 1998
INVENTOR(S): HIDEFUMI OHSAWA It is certified that error appears in the above-identified patent and that said Letters Patent is hereby corrected as shown below:

<u>IN THE DRAWINGS</u>

Sheet 2, Figure 2, "HUFFUMAN" (both occurrences) should read --HUFFMAN--.

<u>COLUMN 7</u>

Line 54, "may" should read --may be--.

Signed and Sealed this

Tenth Day of August, 1999

Attest:

Q. TODD DICKINSON

Attesting Officer

Acting Commissioner of Patents and Trademarks